US008598376B2

(12) United States Patent  
Boam et al.

(10) Patent No.: US 8,598,376 B2  
(45) Date of Patent: Dec. 3, 2013

(54) DEACIDIFICATION METHOD

(75) Inventors: Andrew Timothy Boam, London (GB); Fui Wen Lim, London (GB)

(73) Assignee: Evonik Membrane Extraction Technology Limited, London (GB)

( * ) Notice: Subject to any disclaimer, the term of this patent is extended or adjusted under 35 U.S.C. 154(b) by 778 days.

(21) Appl. No.: 12/306,488

(22) PCT Filed: Jun. 28, 2007

(86) PCT No.: PCT/NO2007/000242  
§ 371 (c)(1), (2), (4) Date: Feb. 10, 2010

(87) PCT Pub. No.: WO2008/002154  
PCT Pub. Date: Jan. 3, 2008

(65) Prior Publication Data  
US 2010/0130761 A1    May 27, 2010

(30) Foreign Application Priority Data  
Jun. 28, 2006    (GB) .................................. 0612845.8

(51) Int. Cl.  
*C11B 5/00* (2006.01)

(52) U.S. Cl.  
USPC ....... 554/14; 554/8; 554/12; 554/13; 554/206

(58) Field of Classification Search  
USPC .................................. 554/8, 12, 13, 14, 206  
See application file for complete search history.

(56) References Cited

FOREIGN PATENT DOCUMENTS

| EP | 125 907 | * 11/1984 |
|---|---|---|
| EP | 0125907 A | 11/1984 |
| EP | 0125907 A1 | 11/1984 |

OTHER PUBLICATIONS

Krishna Kumar and O N Bhowmick N S: "Separation of fatty acids/triglycerols by membranes" 1996, Journal of the American Oil Chemists' Society, pp. 399-401.*  
Zwijnenberg et al,: "Acetone-Stable Nanofiltration Membranes in Deacidifying Vegetable Oil" 1999, Journal of the American Oil Chemists' Society, pp. 83-87.*

(Continued)

*Primary Examiner* — Deborah D Carr  
(74) *Attorney, Agent, or Firm* — Kilpatrick Townsend & Stockton LLP

(57) ABSTRACT

There is provided a process for reducing the free fatty acid content of natural oils by contacting the crude natural oil with a solvent to produce an oil product phase substantially depleted in free fatty acids and a free fatty acid rich solvent phase containing the extracted free fatty acids and some of the glycerides, and processing the free fatty acid rich solvent phase with a membrane to recover the glycerides from the solvent phase, comprising the steps of: (a) contacting the crude natural oil with an immiscible solvent; (b) separating the deacidifed natural oil phase from the solvent phase; (c) providing a selectively permeable membrane having a first surface and a second surface; (d) transferring a portion of the solvent and a portion of the free fatty acids and a lesser portion of the glycerides from the first surface to the second surface across the membrane by contacting the free fatty acid rich solvent phase with the first surface, wherein the pressure at the first surface is greater than the pressure at the second surface, and wherein the membrane is a selectively permeable membrane such that the membrane rejections of the free fatty acids (RFFA) and glycerides (RGLY) are greater than 0%, and the membrane rejection (RGLY) of the glycerides is at least 5% greater than the membrane rejection (RFFA) of the free fatty acids.

44 Claims, 1 Drawing Sheet

(56) References Cited

OTHER PUBLICATIONS

Raman et al: Solvent Recovery and Partial Deacidification of Vegetable Oils by Membrane Technology, (Jan. 1996), pp. 10-14.*
Koike et al..: "Separation of oil constituents in organic solvents using polymeric membranes" J American Oil Chemists Society, vol. 79, No. 9, 2002, pp. 937-942.*
Ribeiro et al. "Solvent recovery from soybean/hexane miscella by polymeric membranes" Journal of Membrane Science, vol. 282, Jun. 2, 2006, pp. 328-336.*
Subramanianet al: "Differential permeation of oil constituents in nonporous denser polymeric membranes"Jun. 15, 2001, Journal of Membrane Science, pp. 57-69.*
Koseoglu S S: "Membrane Technology for Edible Oil Refining" 1991, pp. 16,18,20-21.*
Krishna Kumar, N.S. and Bhowmick, D.N.; "Separation of fatty acids /triacylglycerol by membranes;" 1996; *Journal of the American Oil Chemists' Society*; pp. 399-401.
Zwijnenberg, H.J., et al.; "Acetone-Stable Nanofiltration Membranes in Deacidifying Vegetable Oil;" 1999; *Journal of the American Oil Chemists' Society*; pp. 83-87.
Raman, L.P., et al.; "Solvent Recovery and Partial Deacidification of Vegetable Oils by Membrane Technology;" Jan. 1996; *Fett/Lipid*; pp. 10-14.
Koike, S., et al.; "Separation of Oil Constituents in Organic Solvents using Polymeric Membranes;" 2002; *J. American Oil Chemists' Society*; vol. 79; No. 9; pp. 937-942.
Badan Ribeiro, A.P., et al.; "Solvent recovery from soybean/hexane miscella by polymeric membranes;" Jun. 2, 2006; *Journal of Membrane Science*, vol. 282; pp. 328-336.
Subramantian, R., et al.; "Differential permeation of oil constituents in nonporous denser polymeric membranes;" Jun. 15, 2001; *Journal of Membrane Science*; vol. 187; pp. 57-69.
Koseoglu, S.S.:; "Membrane Technology for Edible Oil Refining;",1991, *Oils and Fats International*; Issue 5; pp. 16, 18, 20-21.

\* cited by examiner

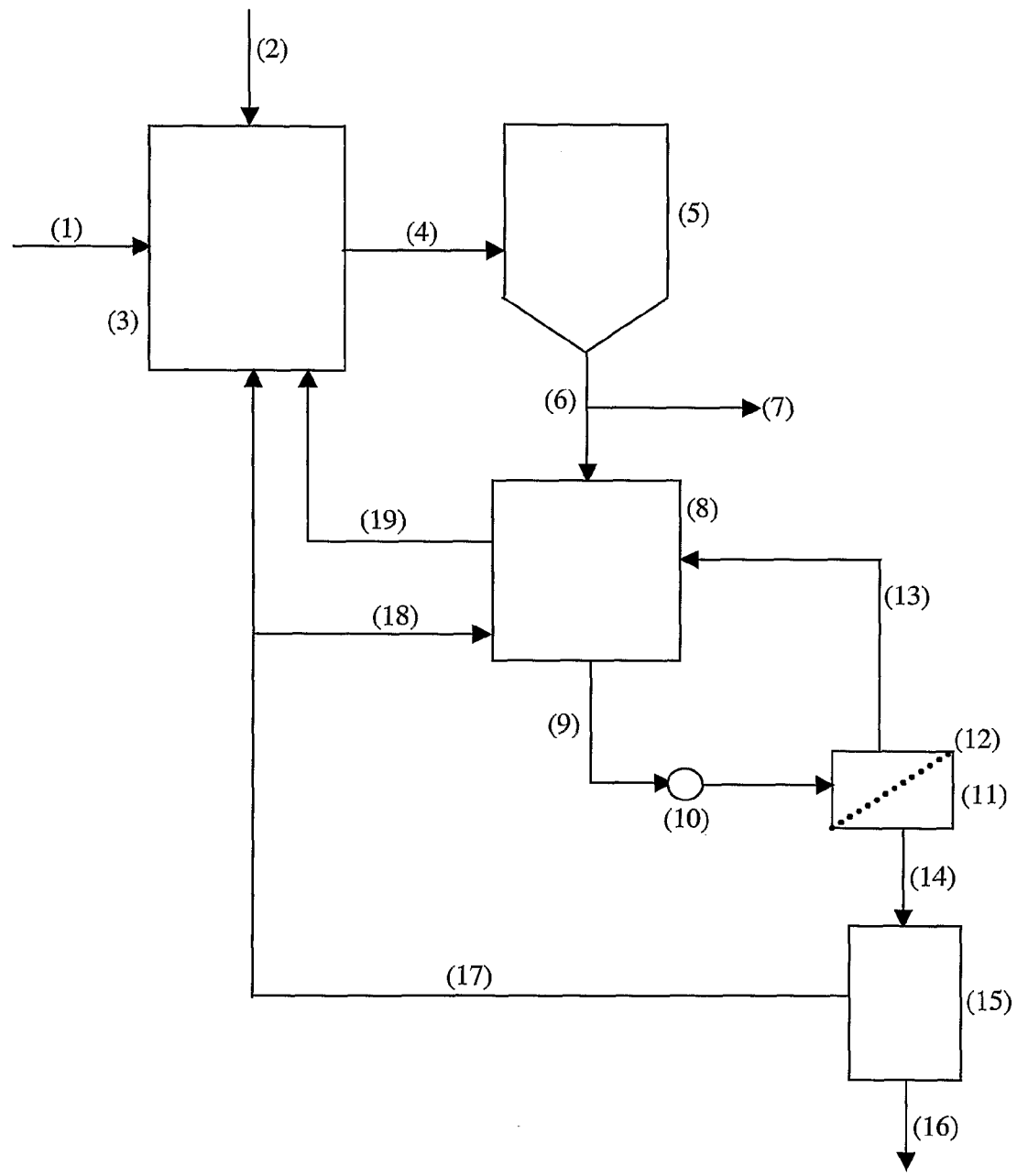

DEACIDIFICATION METHOD

CROSS-REFERENCE TO RELATED APPLICATIONS

This application is a National Stage of International Application No. PCT/NO2007/000242, filed Jun. 28, 2007, and which claims the benefit of GB Patent Application No. 0612845.8, filed Jun. 28, 2006, the disclosures of both applications being incorporated herein by reference.

The present invention relates to processes for reducing the free fatty acid content of natural oils. In another aspect it relates to the use of an immiscible solvent to extract free fatty acids from a natural oil to a sufficiently low concentration such that the oil can be further processed or used. In another aspect, it relates to the preferential separation of free fatty acids and glycerides in the extracting solvent using nanofiltration membranes, such that the free fatty acids permeate the membrane with the solvent and the membrane retains the glycerides. In particular, the process comprises utilising organic solvent nanofiltration membranes to recover glycerides from the solvent used to deacidify the natural oil and thus maximise recovery of glycerides, whilst providing a solvent permeate stream rich in free fatty acids.

Natural oils are typically extracted from a wide variety of vegetable, animal, marine, freshwater and fish feedstocks, e.g. palm nut, corn, soya beans, coconuts, peanut, olives, sunflower, rice bran, oily fish, krill and shellfish. Also, natural oils are derived from microorganisms/single cell organism sources. In some cases, e.g. olives, a particularly pure form of oil (e.g. virgin olive oil) is formed by mechanically crushing and pressing the feedstock to liberate the oil as the oil is naturally present at high concentration. However, the oil concentration in most feedstocks is low and cannot usually be obtained by simply mechanically pressing or crushing the feed. Instead, the prepared feedstock is usually mixed with an appropriate solvent to extract the oil, and the oil is then concentrated by evaporating the solvent. Steam distillation and supercritical fluid extraction (e.g. supercritical carbon dioxide) are sometimes used to extract oils, however in the majority of cases standard organic solvents are used. The extracted oil consists mainly of the desirable glycerides (mono, di and tri esters of glycerol and fatty acids), but will also contain undesirable species such as free fatty acids (i.e. fatty acids that are not esterified with glycerol) that co-extract into the organic solvent or are produced from degradation of the glycerides during processing. Once the oils have been extracted, they are present at relatively low concentration in the solvent. Consequently, the solvent is evaporated to provide a crude natural oil.

One of the key issues affecting the quality of all extracted oils is the presence of free fatty acids in the crude natural oil. For instance, these species impart undesirable taste and odour qualities to oils used for food, they may cause corrosion and contamination when the oils are used for industrials purposes such as lubrication, and they may interfere with further processing of the glycerides if chemical conversions are carried out. By way of non-limiting example, further processing by chemical conversion may include the production of bio-diesel, and transesterification processes. Consequently, it is normal practice for those skilled in the art to deacidify crude natural oils before they are further processed. Conventional deacidification practice is to use either a physical or chemical deacidification technique.

Physical deacidification is carried out by distilling the crude natural oil at high temperature under vacuum, in some cases with live steam injection, to remove as large an amount of free fatty acids as possible. This technique is useful, provided that the natural oil has high temperature stability, and that valuable components do not undergo chemical alteration (e.g. oxidation, isomeric rearrangement, etc.) or get stripped from the oil (due to volatilisation) during the physical deacidification. However, it is an energy intensive process, requiring both steam and vacuum to provide an efficient process, and can result in yield loss of the neutral natural oil (e.g. U.S. Pat. No. 6,844,458).

Chemical deacidification is carried out by washing the crude natural oil with a sodium hydroxide solution. This converts the free fatty acids to their sodium salts. The fatty acid sodium salts are not soluble in the natural oil and hence the natural oil is deacidified. As this process does not need to be carried out at high temperature it is much less energy intensive than physical deacidification, and it can also be applied to oils containing valuable temperature sensitive molecules. However, this technique also has several drawbacks: (1) the sodium hydroxide can hydrolyse the valuable glycerides as well as neutralise the free fatty acids thus reducing the oil yield; (2) the fatty acid sodium salts generated by this technique are generally classed as soaps and these species form solids/scums in the two phase wash mixture, requiring the use of a solid/liquid separation technique, such as centrifugation, to complete the separation; (3) the soap species can stabilise oil droplets and generate oil-containing inclusion bodies that reduce the yield of the natural oil, particularly when the oil has a high fatty acid content; (4) large volumes of water may be required to wash the oil free of sodium hydroxide once the caustic wash is complete; (5) large volumes of wastewater are generated by both the sodium hydroxide solution and wash waters, and; (6) fatty acids in the sodium salt form have much less value than in the free acid form (Raman et al. JAOCS 73, 219-224 (1996); U.S. Pat. No. 6,844,458). Thus, though it is widely applicable to many oils and commonly used, chemical deacidification has significant limitations.

It can be understood by one skilled in the art that though the conventional deacidification techniques are practical and in widespread use, they do confer a number of limitations and problems to the user. This is particularly so for natural oils containing high-value temperature-sensitive species, and for obtaining high yields of the natural oil from the deacidification process.

Membrane processes are well known in the art of separation science, and can be applied to a range of separations of species of varying molecular weights in liquid and gas phases (see for example "Membrane Technology" in Kirk Othmer Encyclopedia of Chemical Technology, $4^{th}$ Edition 1993, Vol 16, pages 135-193). Nanofiltration is a membrane process utilising membranes whose pores are in the range 0.5-5 nm, and which have MW cutoffs of 200-2000 Daltons. Nanofiltration has been widely applied to the filtration of aqueous fluids, but due to a lack of suitable solvent stable membranes it has not been widely applied to the separation of solutes in organic solvents.

U.S. Pat. Nos. 5,205,934 and 5,265,734 describe processes for producing composite nanofiltration membranes which comprise a layer of a silicone polymer immobilised onto a support, preferably a polyacrylonitrile support. These composite membranes are claimed to be solvent stable and are claimed to have utility for the separation of high molecular weight solutes, including organometallic catalyst complexes, from organic solvents. The performance of these composite membranes in separating solutes from methanol solutions has been described in the open literature ("Nanofiltration studies of larger organic microsolutes in methanol solutions", Whu J.

A., Baltzis B. C., Sirkar K. K. Journal of Membrane Science 170 (2000) pages 159-172), and their performance in permeation of pure solvent phases has also been reported ("Effect of solvent properties on permeate flow through nanofiltration membranes. Part I—investigation of parameters affecting solvent flux" Machado D. R., Hasson D., Semiat R. Journal of Membrane Science 163 (1999) pages 93-102). The application of these membranes to recovering solvents from chromatographic systems is described in U.S. Pat. No. 5,676,832.

U.S. Pat. No. 5,264,166 describes processes for the production of asymmetric polyimide membranes, which are claimed to be stable in solvents such as toluene, benzene, xylene, methyl ethyl ketone (MEK) and methyl iso butyl ketone (MIBK). These asymmetric membranes are claimed to have utility for the separation of low molecular weight organic materials with a molecular weight in the range 300-400 Da from solvents with molecular weight of around 100 Da. The application of these membranes to solvent recovery from lube oil filtrates is described in U.S. Pat. Nos. 5,360,530; 5,494,566; 5,651,877, and in the open literature in "Solvent recovery from lube oil filtrates with a polyimide membrane" White L. S., Nitsch A. R. Journal of Membrane Science 179 (2000) pages 267-274.

Membrane processes used in conjunction with deacidification by solvent extraction that are described in the literature have primarily focussed on recovering the solvent, with only a limited number of open literature works referring to the potential of using membranes to recover glycerides from the extraction solvent.

Koseoglu et al (J. Am. Oil Chem Soc 67(5), 315-322 (1990)) teach the use of reverse osmosis and nanofiltration membranes to recover solvents used in cottonseed oil processing. However, they note limitations of flux, membrane selectivity and membrane stability in pilot-scale processes, due to the use of membranes designed for use in aqueous environments.

Krishna Kumar and Bhowmick (J. Am. Oil Chem Soc 73(3), 399-401 (1996)) teach the membrane separation of free fatty acids and glycerides from groundnut oil and rice bran oil. The authors use membranes designed for use in aqueous environments and do not demonstrate high selectivity between the free fatty acids and glycerides.

Kale et al (J. Am. Oil Chem Soc 76(6), 723-727 (1999)) teach the use of methanol to extract free fatty acids from rice bran oil, and then to concentrate the free fatty acids and recover the methanol using reverse osmosis membranes. Raman et al. (J. Am. Oil Chem Soc 73(2), 219-224 (1996)) teach the use of methanol to extract free fatty acids from soybean oil, and then concentrate the free fatty acids and recover the methanol using nanofiltration or reverse osmosis membranes. In both cases, the solvent, methanol, is chosen to provide a good selectivity for the free fatty acids and provide compatibility with membranes designed for use in aqueous environments, but limits use of the rice bran oil product as methanol is toxic.

Zwijnenberg et al (J. Am. Oil Chem Soc 76(1), 83-87 (1999)) teaches the use of nanofiltration to separate the free fatty acids from triglycerides in homogeneous solutions formed from mixing vegetable oils with acetone (<10% w/w of oil). By dissolving the whole vegetable oil, a large volume of acetone is required to deacidify the vegetable oil. Also, the authors do not teach how reduce their deacidification process to practice.

Cheryan (Membrane Technology, February 2005) teaches the use of solvent extraction to deacidify crude natural oils in combination with nanofiltration to recover the extracting solvent and separate the free fatty acids. Cheryan also notes that the ideal deacidification process would involve using a nanofiltration membrane to separate free fatty acids and glycerides, however he teaches that it is not possible to reduce this concept to practice due to the small difference in molecular size of free fatty acids and glycerides and low permeate fluxes.

U.S. Pat. No. 6,433,146, US Pat Appl 20050049400 and US Pat Appl 20060063920 describe processes for corn oil production. The described processes incorporate nanofiltration steps to concentrate the corn oil extract and recover ethanol used to extract the oil.

In the above prior art, membrane separation using nanofiltration membranes designed for use in organic solvents has not been applied to the separation of free fatty acids and glycerides from the solvent used to solvent extract free fatty acids from natural oils. The use of membranes in deacidification has only been applied to a narrow range of vegetable oils and for the main purpose of recovering the solvent by separating the solvent from FFA and triglycerides. Also, the choice of solvents in the prior art has been limited to those that provide good selectivity for extracting free fatty acids and allow stability of membranes designed for use in aqueous environments. For practical application in areas such as food processing and pharmaceutical production, it is preferred that solvents acceptable for direct contact with food ingredients are used, e.g. ethanol, hexanes and petroleum ethers. However, though the free fatty acids are extracted using ethanol, for example, a portion of the glycerides in the natural oil also dissolve into ethanol; these must be recovered to obtain an acceptable oil yield from the process.

The present invention addresses the problems of the prior art.

In one aspect the present invention provides a process for reducing the free fatty acid content of natural oils by contacting the natural oil with an immiscible solvent to produce an oil product phase substantially depleted in free fatty acids and a free fatty acid rich solvent phase containing the extracted free fatty acids and some of the glycerides, and processing the free fatty acid rich solvent phase with a membrane to recover the glycerides from the solvent phase. This membrane filtration also generates a membrane permeate composition enriched in fatty acids. This process comprises the steps of: (a) contacting the crude natural oil with an immiscible solvent; (b) separating the deacidifed natural oil phase from the solvent phase; (c) providing a selectively permeable membrane having a first surface and a second surface; (d) transferring a portion of the solvent and a portion of the free fatty acids and a lesser portion of the glycerides from the first surface to the second surface across the membrane by contacting the free fatty acid rich solvent phase with the first surface, wherein the pressure at the first surface is greater than the pressure at the second surface, and wherein the membrane is a selectively permeable membrane such that the membrane rejections of the free fatty acids ($R_{FFA}$) and glycerides ($R_{GLY}$) are greater than 0%, and the membrane rejection ($R_{GLY}$) of the glycerides is at least 5% greater than the membrane rejection ($R_{FFA}$) of the free fatty acids.

In a further embodiment the organic liquid retained at the first surface of the membrane in step (d) can be further enriched in the glycerides through the steps of: (e) providing a selectively permeable membrane having a first surface and a second surface; (f) transferring a portion of the process solvent and a portion of the free fatty acids and a lesser portion of the glycerides from the first surface to the second surface across the membrane by contacting the process solvent from step (d) with the first surface, wherein the pressure at the first surface is greater than the pressure at the second surface, and wherein the membrane is a selectively permeable membrane such that the membrane rejections of the free fatty acids ($R_{FFA}$) and glycerides ($R_{GLY}$) are greater than 0%, and the membrane rejection ($R_{GLY}$) of the glycerides is at least 5% greater than the membrane rejection ($R_{FFA}$) of the free fatty acids; (g) adding a further portion of the process solvent to the organic liquid retained at the first surface of the membrane in step (f).

By the term "selectively permeable" it is meant a membrane, which will allow the passage of solvents while retarding the passage of solutes, such that a solute concentration difference can be produced by the solvent flow across the membrane. The term selectively permeable may be defined in terms of membrane rejection R, a common measure known by those skilled in the art and defined for species i as:

$$R_i = \left(1 - \frac{C_{Pi}}{C_{Ri}}\right) \times 100\% \qquad (1)$$

where $C_{P,i}$=concentration of species i in the permeate, permeate being the organic liquid which has passed through the membrane, and $C_{R,i}$=concentration of species i in the retentate, retentate being the organic liquid which has not passed through the membrane. It will be appreciated that a membrane is selectively permeable for a species if R>0.

By the term "solute" it is meant an organic molecule (by non-limiting example free fatty acids and glycerides) with a molecular weight <5000 Daltons which is present dissolved in solvent, such that the concentration of solute in the resultant organic liquid mixture is less than 50 wt %.

By the term "solvent" it is meant an organic liquid with molecular weight less than 300 Daltons or a mixture of water and an organic liquid with molecular weight less than 300 Daltons or a mixture of two organic liquids with molecular weights less than 300 Daltons, in which the solute can be dissolved to a concentration of at least 0.1 wt %.

In a further aspect the process may be carried out continuously so that steps (c) and (d) or (f) and (g) are performed simultaneously.

In yet a further aspect the rejection performance of the membrane may be improved by pre-soaking the membrane in one or more of the solvents to be used in the membrane separation.

In yet a further aspect, the process may be carried out discontinuously.

In yet a further aspect, more than one selectively permeable membrane may be employed, so that the membranes used in steps (d) and (f), or in multiple repeats of step (f), may be different. This allows the membrane to be chosen to provide the best combination of solvent flux and solute rejection for a specific composition of the solvent phase to be contacted with the membrane.

In yet a further preferred embodiment, the membrane may be backflushed using either solvent or gas, to remove deposited material and improve flux.

Preferably the glycerides will have a molecular weight of above 300 Daltons; yet more preferably above 400 Daltons, and yet more preferably above 500 Daltons.

Preferably the free fatty acids will have a molecular weight below 400 Daltons and yet more preferably below 300 Daltons.

The solvent will be chosen with regard to solubility of solutes, ability to extract free fatty acids, and viscosity, among other factors such as cost and safety. Suitable solvents are numerous and well known to those skilled in the art. By way of non-limiting example, suitable solvents include ketones, glycols, esters, ethers, aldehydes, alcohols, and polyols, and mixtures thereof.

By way of non-limiting example, specific examples of solvents include butyl acetate, methyl ether ketone (MEK), acetone, ethanol, methanol, propanol, butanol, butanediol, PEG-400, and mixtures thereof.

The membrane of the present invention can be configured in accordance with any of the designs known to those skilled in the art, such as spiral wound, plate and frame, shell and tube, and derivative designs thereof. The membranes may be of cylindrical or planar geometry.

The membrane of the present invention may be a porous or a non-porous membrane. Suitable membranes will have a rejection for glycerides greater than 0%, yet more preferably greater than 50%, yet more preferably greater than 75%, yet more preferably greater than 90% and yet more preferably greater than 95%.

The membrane of the present invention may be a porous or a non-porous membrane. Suitable membranes will have a rejection for free fatty acids less than 100%, yet more preferably less than 70%, yet more preferably less than 50%, and yet more preferably less than 40%.

The membrane of the present invention may be formed from any polymeric or ceramic material that allows solvent permeation and provides a separating layer capable of preferentially separating the free fatty acids from the glycerides in steps (d) or (f). Preferably the membrane is formed from or comprises a material selected from polymeric materials suitable for fabricating microfiltration, ultrafiltration, nanofiltration or reverse osmosis membranes, including polyethylene, polypropylene, polytetrafluoroethylene (PTFE), polyvinylidene difluoride (PVDF), polyethersulfone, polyacrylonitrile, polyimide, polyimides including polyimides crosslinked using mono-, di-, tri- or polyamine species, cellulose acetate, and mixtures thereof. The membranes can be made by any technique known to the art, including sintering, stretching, track etching, template leaching, interfacial polymerisation or phase inversion. Yet more preferably the membrane is prepared from an inorganic material such as by way of non-limiting example silicon carbide, silicon oxide, zirconium oxide, titanium oxide, or zeolites, using any technique known to those skilled in the art such as sintering, leaching or sol-gel processes.

In a preferred aspect the membrane is non-porous and the non-porous, selectively permeable layer thereof is formed from or comprises a material selected from modified polysiloxane based elastomers including polydimethylsiloxane (PDMS) based elastomers, ethylene-propylene diene (EPDM) based elastomers, polynorbornene based elastomers, polyoctenamer based elastomers, polypropylene oxide (PPO) based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polypropylene glycol (PPG) based elastomers, polyethylene, polypropylene, polytetrafluoroethylene (PTFE), polyvinylidene difluoride (PVDF) based elastomers, polyetherblock amides (PEBAX), and mixtures thereof.

In a preferred aspect the membrane comprises a reinforcing material selected from an external mesh and support. This is particularly advantageous for homogenous tubes or sheets. Such tubes or sheets may be reinforced to increase their burst pressure, for example by overbraiding tubes using fibres of metal or plastic, or by providing a supporting mesh for flat sheets.

When the membrane comprises a non-porous layer and an additional component, the additional component may be a supporting layer. The supporting layer may be a porous support layer. Suitable materials for the open porous support structure are well known to those skilled in the art of membrane processing. Preferably the porous support is formed from or comprises a material selected from polymeric materials suitable for fabricating microfiltration, ultrafiltration, nanofiltration or reverse osmosis membranes, including polyethylene, polypropylene, polytetrafluoroethylene (PTFE), polyvinylidene difluoride (PVDF), polyethersulfone, polyetheretherketone (PEEK), polyacrylonitrile, polyamide, polyimide, and mixtures thereof.

Selectively permeable membranes useful for the present invention are disclosed in U.S. Pat. Nos. 5,205,934; 5,265,734; 4,985,138; 5,093,002; 5,102,551; 4,748,288; 4,990,275; 4,368,112 and 5,067,970. Preferred membranes are produced by WR Grace & Co and are described in U.S. Pat. No. 5,624,166 and U.S. Pat. No. 6,108,008.

The process may be performed in a continuous, semi-continuous or discontinuous (batch mode) manner.

The process may be performed using dead-end or cross-flow filtration. In cases where dead-end filtration is used the pressure may be supplied through a suitable pump or through a pressurizing gas, or through any other device designed to exert pressure at the first surface of the membrane.

The process may be performed using solvent extraction equipment known to those skilled in the art, such as by way of non-limiting example hydrocyclones and liquid-liquid centrifugal contactors. The extraction process may be operated in co-current or counter-current mode, and may be operated as a batch, semi-continuous or continuous process.

Moreover, the deacidified oil, prepared according to at least one of the previously mentioned processes, can for instance be used as raw material for the production of biodiesel, edible oils, food supplements (such as EPAX 6000TG, EPAX4510TG and EPAX 1050TG) and Pharmaceuticals.

In a preferred embodiment, the deacidified oil, achieved by the invented process, is used as raw material for the production of a mixed fatty acid composition comprising at least the omega-3 fatty acids eicosapentaenoic acid (EPA) and docosahexaenoic acid (DHA) as triglycerides. The deacidified oil can preferably be used in further processing steps in order to achieve a final lipid concentrate, preferably "rich" in EPA and DHA as tri-glycerides or in the form of methyl or ethyl esters. A lipid ethyl ester composition including at least 80% by weight of EPA and DHA can for instance be sold under the trademark Omacor® (Pronova Biocare AS, Norway).he invention will now be described, by way of example only, with reference to the accompanying drawing in which:

FIG. 1 is a schematic of an apparatus operating the process of the present invention.

FIG. 1 shows a schematic of one embodiment of the process. The crude natural oil (1), fresh solvent (2), recovered glyceride solution (19) and optionally recovered solvent (17) are fed to a mixing system (3) to contact the crude natural oil and solvent to extract the free fatty acids from the crude natural oil. The combined crude natural oil and solvent are fed (4) to a phase separation system (5). Once phase separation is accomplished, the deacidified natural oil is discharged as the primary product stream (7). The free fatty acid rich solvent phase is transferred to a feed vessel (8) for the membrane filtration system. The free fatty acid rich solvent phase is recirculated (9) by a pump (10) through a membrane module (11) containing a selectively permeable membrane (12). A portion of the solvent phase permeates through the membrane under the pressure applied by the pump and exits the module (14). The solvent phase depleted in fatty acids (13) is returned to the feed vessel (8). The fatty acid depleted solvent phase is withdrawn from the feed vessel and recycled (19) to the mixing system (3). The membrane permeate (14) leaving the membrane module (11) is transferred to a solvent recovery unit (15) where solvent is separated from the free fatty acid. A free fatty acid rich stream (16) is removed from the process. The recovered solvent (17) is returned to the mixing vessel (3) for reuse in the free fatty acid extraction process, and optionally a portion of the recovered solvent can be recycled to the feed vessel (8) to enhance the separation of free fatty acids and glycerides by the semi-permeable membrane. The process in this embodiment is operated as a cross-flow filtration process. In this configuration it is possible to use the cross-flow velocity of the membrane to avoid the build-up of layers of solute on the surface of the membrane. Any or all of flows (1), (2), (4), (6), (7), (9), (13), (14), (16), (17), (18) and (19) may be continuous or discontinuous.

The invention will now be described in further detail in the following non-limiting Examples.

EXAMPLES

Example 1

The solvent flux and rejection of free fatty acids (FFA) and di- and tri-glycerides (DTG) for various membranes manufactured by the Davison Membranes division of WR Grace (USA) is demonstrated in this example. Membranes selected for this study are listed in Table 1, showing their membrane properties:

TABLE 1

Membrane Properties (Manufacturer's Data)

| Membrane | Membrane Type | MW Cutoff* (Daltons) |
|---|---|---|
| STARMEM 120 | Asymmetric polyimide | 200 |
| STARMEM 122 | Asymmetric polyimide | 220 |
| STARMEM 228 | Asymmetric polyimide | 280 |
| STARMEM 240 | Asymmetric polyimide | 400 |

*Defined as the molecular weight at which the membrane achieved 90% rejection of a homologous series of n-alkanes, each alkane dissolved at 2 wt % in toluene.

Retention and fluxes were determined using a METcell crossflow filtration system (Membrane Extraction Technology Ltd., London, UK). The crossflow filtration apparatus consisted of an 800 mL capacity feed vessel and a pumped recirculation loop through four crossflow cells. For each crossflow cell, membrane discs were cut from A4 sheets in circular discs of 90 mm diameter, giving a total active membrane area of 216 cm². All experiments were carried out in a fume cupboard. The crossflow system was pressurised with compressed nitrogen gas in the range 5 to 50 bar. Mixing in the crossflow cells was provided by flow from a gear pump—the flow is introduced tangentially to the membrane surface at the outer diameter of the membrane disk and follows a spiral flow pattern to a discharge point at the centre of the filtration cell/disk. Each nanofiltration membrane disk was conditioned with ethanol at the operating pressure (15 bar and 30 bar) and temperature (60° C.) until a constant flux was obtained, to ensure that any preservatives/conditioning agents were washed out of the membrane and maximum compaction of the membrane was achieved at the operating pressure.

500 mL of feed solution, consisting of 45 mL of fish oil and 455 mL of pure ethanol, were introduced to the feed vessel. The test mixture was then permeated across each conditioned membrane disk at the desired operating temperature and pressure with permeate fed back into the feed vessel using a HPLC pump. Samples of feed, permeate and retentate solutions were then collected for analysis. The cell was pressurised with compressed nitrogen gas at pressures of 15 and 30 bar. The solvent flux (J) was obtained by:

$$J = \frac{V}{At} \quad (2)$$

where V is the volume of permeate, A is membrane area and t is time.

Results from these tests are shown in Table 2 below:

TABLE 2

Results for flux and rejection. Fluxes are measured in L m$^{-2}$ h$^{-1}$ (LMH) at 60° C. and the specified pressure. (Solute rejection of free fatty acids (FFA) and glycerides (DTG) is defined in equation (1).)

| Membrane | Flux (LMH) 15 bar | Flux (LMH) 30 bar | FFA rejection (%) 15 bar | DTG rejection (%) 15 bar | FFA rejection (%) 30 bar | DTG rejection (%) 30 bar |
|---|---|---|---|---|---|---|
| STARMEM 240 | 35 | 44 | 26 | 52 | 20 | 42 |
| STARMEM 228 | 4 | 5 | 35 | 56 | 11 | 50 |
| STARMEM 122 | 30 | 34 | 15 | 84 | 42 | 94 |
| STARMEM 120 | 32 | 37 | 13 | 98 | 56 | 99 |

Based on these results, each of these membranes is suitable for use in the process, and the best results will be achieved using STARMEM 120 or STARMEM 122.

Example 2

The overall deacidification process with recovery of glycerides by membrane filtration, carried out following the process of the invention, is demonstrated in this example.

A batch of 100 mL of fish oil (Batch 1), containing 7.5 wt % free fatty acids, was mixed with 300 mL of ethanol in a 1 L conical flask. Mixing was carried out for 60 minutes using a magnetic stirrer. After mixing, the solution was transferred to a 1 L separating funnel and allowed to settle overnight. The settled phases were then separated. The ethanol phase was collected and stored for membrane filtration, and the fish oil phase was returned to the conical flask. A second aliquot of 300 mL of ethanol was added to the fish oil in the 1 L conical flask, mixed on a magnetic stirrer for an hour, and returned to the 1 L separating funnel. The mixture was allowed to settle overnight. The settled phases were then separated. The second ethanol phase was collected and stored for membrane filtration, and the fish oil phase was returned to the conical flask. A third aliquot of 300 mL of ethanol was added to the fish oil in the 1 L conical flask, mixed on a magnetic stirrer for an hour, and returned to the 1 L separating funnel. The settled phases were then separated. The ethanol phase was collected and stored for membrane filtration, and the deacidifed fish oil product was stored. The results of this solvent extraction deacidification process are presented as Batch 1 in Table 3. The process is very effective at removing free fatty acids—the product contained only 0.02 wt % free fatty acids. However, the yield of glycerides (DTG) from the solvent extraction at 60% is low.

In order to improve the glyceride yield and provide a practical process, the three 300 mL aliquots of ethanol were mixed together to provide 900 mL of a solution containing free fatty acids and glycerides in ethanol and membrane filtered in a METcell crossflow system (as described in Example 1). Four 90 mm diameter disks of STARMEM 120 membrane were cut from an A4 sheet of membrane, and loaded into the crossflow filtration cells to provide 216 cm$^2$ of membrane area. All experiments were carried out in a fume cupboard. Each nanofiltration membrane disk was conditioned with ethanol at the operating pressure (15 bar) and temperature (60° C.) until a constant flux was obtained, to ensure that any preservatives/conditioning agents were washed out of the membrane and maximum compaction of the membrane was achieved at the operating pressure. 700 mL of the ethanol solution was then fed into a METcell crossflow system and the volume of the solution reduced by filtering the solution with the membrane at 55° C. and 15 bar. Once 200 mL of permeate was collected, the remaining volume of the ethanol solution was fed into the METcell crossflow system using an HPLC pump. Permeation was stopped once 73% of the ethanol solution had been collected as permeate. As shown in Table 3, the permeate contained a high fraction of free fatty acids (60 wt % ((g free fatty acid)/(g glycerides))) relative to the glycerides with only 1.9 g of the 83.4 g of glycerides fed into the batch present in the permeate. The membrane retentate was stored for use in processing a second batch of fish oil.

A second batch of 100 mL of fish oil (Batch 2) was mixed with the glyceride rich membrane retentate from the first batch in a 1 L conical flask. Mixing was carried out for 60 minutes using a magnetic stirrer. After mixing, the solution was transferred to a 1 L separating funnel and allowed to settle overnight. The settled phases were then separated. The ethanol phase was collected and stored, and the fish oil phase returned to the conical flask. An aliquot of 300 mL of fresh ethanol was added to the fish oil in the 1 L conical flask, mixed on a magnetic stirrer for an hour, and returned to the 1 L separating funnel. The mixture was allowed to settle overnight. The settled phases were then separated. The second ethanol phase was collected and stored, and the fish oil phase was returned to the conical flask. A third aliquot of 300 mL of ethanol was added to the fish oil in the 1 L conical flask, mixed on a magnetic stirrer for an hour, and returned to the 1 L separating funnel. The settled phases were then separated. The ethanol phase was collected and stored, and the deacidified fish oil product was stored. The results of this solvent extraction deacidification process are presented as Batch 2 in Table 3. Following the filtration procedure outlined for Batch 1, the three 300 mL ethanol solutions were mixed together and membrane filtered. The permeate was enriched in fatty acids (see Batch 2 in Table 3) and contained 64 wt % free fatty acids ((g free fatty acid)/(g glycerides)), with only 2.3 g of the 83.4 g of glycerides fed into the batch present in the permeate.

The process was again very effective at removing free fatty acids in Batch 2—the product contained only 0.22 wt % free fatty acids. However, the practical benefit of using the membrane is clearly seen in Table 3 in the yield of glycerides (DTG) from the second batch—from Batch 1 the glyceride yield was 60% (i.e. without any recovery of glycerides), whereas for Batch 2 the glyceride yield was increased to 88%. Processing further batches of oil using membrane filtration to recycle the glyceride, will increase the glyceride yield to >90% as the glycerides accumulate to a steady state concentration in the system.

TABLE 3

Experimental results of the proposed ethanol wash/nanofiltration process. (FFA = Free fatty acids; DTG = Di-, and Tri-glycerides)

|  | Batch 1 | Batch 2 |
| --- | --- | --- |
| Mass of FFA fed (g) | 6.8 | 6.8 |
| Mass of DTG fed (g) | 83.4 | 83.4 |
| Product acid value (mgKOH/g oil) | 0.05 | 0.45 |
| Product purity - FFA (wt %) | 0.02 | 0.22 |
| Product purity - DTG (wt %) | 99.98 | 99.78 |
| Mass of FFA in product (g) | 0.01 | 0.2 |
| Mass of DTG in product (g) | 50.3 | 73.6 |
| Total mass of product (g) | 50.4 | 73.8 |
| DTG yield per batch (%) | 60 | 88 |
| Nanofiltration: |  |  |
| FFA feed concentration (g/L) | 7.4 | 7.3 |
| DTG feed concentration (g/L) | 36.9 | 31.4 |
| Average filtration flux (LMH) | 37 | 34 |
| Mass of FFA in permeate (g) | 2.9 | 4.1 |
| Mass of DTG in permeate (g) | 1.9 | 2.3 |
| FFA retention (%) | 58 | 51 |
| DTG retention (%) | 95 | 97 |

Mass balance error of FFA and DTG are 17% and 2% respectively

Example 3

The overall deacidification process with recovery of glycerides by membrane filtration, carried out following the process of the invention, is demonstrated in this example at a multi-kilo scale. In this example the extraction solvent is also recovered using membrane filtration, and re-used in the solvent extraction step.

Five batches consisting of 4 to 10 kg fish oil, containing 4.9 wt % free fatty acids, were contacted with ethanol in a continuous counter-current centrifugal extractor system (Rousellet Robatel, France). The fish oil flowed through the extractor system at a rate of 350 mL h$^{-1}$, and 1.3 L h$^{-1}$ of ethanol flowed counter-current through the system. The two exit streams from the contactor, deacidified fish oil and an ethanol solution containing free fatty acids and glycerides, were collected in separate tanks. The ethanol solution was stored for membrane filtration, and the fish oil phase was stored as the desired product. The results of this solvent extraction deacidification process are presented in Table 4. The process is very effective at removing free fatty acids—the product contained <0.31 wt % free fatty acids. However, the single-pass yield of glycerides (DTG) from the extractor at 68-86.9% is low.

TABLE 4

Summary of the extractions carried out in the continuous counter-current centrifugal extractor (unrefined fish oil feed contained 4.9 wt % FFA, 95.1 wt % DTG)

| Extraction Batch | Fresh Oil Input Kg | Deacidified Oil Product Kg | Product Oil Composition, wt % | | | | DTG Yield from extractor % |
| --- | --- | --- | --- | --- | --- | --- | --- |
|  |  |  | FFA | DTG | EtOH | FFA/DTG |  |
| 1 | 5.5 | 4.19 | 0.20 | 86.38 | 13.42 | 0.23 | 70.1 |
| 2 | 10.9 | 8.06 | 0.21 | 86.30 | 13.49 | 0.24 | 68.0 |
| 3 | 4.0 | 3.10 | 0.26 | 85.15 | 14.59 | 0.31 | 70.3 |
| 4 | 4.0 | 3.83 | 0.23 | 85.62 | 14.15 | 0.27 | 86.9 |
| 5 | 4.0 | 3.07 | 0.23 | 85.65 | 14.12 | 0.27 | 70.0 |

In order to improve the glyceride yield, the ethanol solution containing free fatty acids and glycerides generated in each extraction batch was membrane filtered in a pilot plant using 2.5"×40" STARMEM 122 spiral wound membrane element (Grace Davison Membranes, USA). Once the spiral wound membrane element was loaded into the pressure housing on the pilot plant, the membrane was conditioned with ethanol at 5 bar and elevated temperature (60° C.) until a constant flux was obtained, to ensure that any preservatives/conditioning agents were washed out of the membrane prior to use.

The pilot plant was operated to provide a constant volume filtration. I.e. 15 L of ethanol solution was maintained in the plant at all times, and ethanol solution was fed into the feed tank at the same rate as the combined permeate and retentate were removed from the system. For every 4 kg of permeate passing through the membrane, 1 kg of retentate was removed from the system. The filtrations were carried out at 55° C. and 10 bar, except for the first run reported in Table 5 which was carried out at 15 bar. As shown in Table 5, the permeate contained a high fraction of free fatty acids (>70 wt % ((g free fatty acid)/(g glycerides))) relative to the glycerides, with <1.4% of the glycerides fed into the process present in the permeate. I.e. >98.6% of the glycerides fed into the system will exit the system as deacidified oil, so the overall process yield of glycerides is >98.6%. The membrane retentate was stored and recycled to the next extraction batch—i.e. retentate from Filtration Batch 1 was mixed with fresh fish oil as the feed for Extraction Batch 3; retentate from Filtration Batch 2 was mixed with fresh fish oil as the feed for Extraction Batch 4, etc.

TABLE 5

Summary of the glyceride recovery from the extraction solutoin

| Filtration Batch | Ethanol Solution from Extraction Batch Number (Table 4) | Permeate Weight (kg) | FFA+ in feed, wt % | DTG# in feed, wt % | EtOH* in feed, wt % | FFA in permeate, wt % | DTG in permeate, wt % | EtOH in permeate, wt % | DTG loss, wt % |
|---|---|---|---|---|---|---|---|---|---|
| 1 | 2 | 38.80 | 1.45 | 7.4 | 91.2 | 1.11 | 0.21 | 98.68 | 1.38 |
| 2 | 3 | 12.00 | 1.73 | 8.9 | 89.4 | 1.11 | 0.00 | 98.89 | 0.05 |
| 3 | 4 | 13.50 | 1.37 | 8.0 | 90.7 | 1.20 | 0.40 | 98.40 | 1.25 |
| 4 | 5 | 15.70 | 0.88 | 14 | 85.2 | 0.99 | 0.30 | 98.71 | 1.09 |

*EtOH—Ethanol
+FFA—Free fatty acids
DTG—Di, tri glycerides

Solvent (ethanol) recovery was carried out using a reverse osmosis membrane (Dow FilmTec BW30). A 2.5"×40" spiral wound membrane element was installed in a pilot plant, and the membrane conditioned by permeating ethanol at a temperature of 45° C. and 10 bar until a constant flux was obtained, to ensure that any preservatives/conditioning agents were washed out of the membrane prior to use. The solvent recovery filtrations were carried out at 30 bar and 45° C. (see Table 6).

TABLE 6

Composition of permeate and retentate from ethanol recovery process.

| Recovery Batch No.* | Retention (%) | | Permeate Composition (wt %) | | | Retentate Composition (wt %) | | |
|---|---|---|---|---|---|---|---|---|
| | FFA | DTG | FFA | DTG | ethanol | FFA | DTG | ethanol |
| 1 | 98.97 | 100.00 | 0.02 | 0 | 99.98 | 2.03 | 0.74 | 97.23 |
| 2 | 99.34 | 99.82 | 0.02 | 0.01 | 99.97 | 3.46 | 5.43 | 91.11 |
| 3 | 99.50 | 100.00 | 0.04 | 0 | 99.96 | 7.16 | 10.76 | 82.07 |

As shown in Table 6, ethanol of very high purity (>99.95%) is obtained using this membrane recovery process. This ethanol is suitable for recycle and re-use in the solvent extraction step of the process. The retentate can be further process to separate the free fatty acids from the glycerides, or can be disposed of as waste.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention claimed is:

1. A method for reducing a free fatty acid content of a crude natural oil, comprising:
   (a) contacting the crude natural oil with an immiscible solvent to thereby produce:
   an oil product phase substantially depleted in free fatty acids; and
   a free fatty acid rich solvent phase containing the extracted free fatty acids and further containing glycerides that have been extracted from the crude natural oil;
   (b) separating the oil product phase substantially depleted in free fatty acids from the free fatty acid rich solvent phase;
   (c) providing a selectively permeable membrane having a first surface and a second surface; and
   (d) processing the free fatty acid rich solvent phase with the membrane to recover the glycerides from the solvent phase by contacting the free fatty acid rich solvent phase with the first surface to thereby transfer a portion of the solvent from the first surface to the second surface, wherein the portion of the solvent that is transferred contains a portion of the free fatty acids and a portion of the glycerides, wherein the pressure at the first surface is greater than the pressure at the second surface, and wherein the membrane is a selectively permeable membrane such that the membrane rejections of the free fatty acids (RFFA) and glycerides (RGLY) are greater than 0%, and the membrane rejection (RGLY) of the glycerides is at least 5% greater than the membrane rejection (RFFA) of the free fatty acids.

2. The method of claim 1, wherein the organic liquid retained at the first surface of the membrane in step (d) can be further enriched in the glycerides through the steps of:
   (e) providing a selectively permeable membrane having a first surface and a second surface;
   (f) transferring a portion of the process solvent and a portion of the free fatty acids and a lesser portion of the glycerides from the first surface to the second surface across the membrane by contacting the process solvent from step (d) with the first surface, wherein the pressure at the first surface is greater than the pressure at the second surface, and wherein the membrane is a selectively permeable membrane such that the membrane rejections of the free fatty acids (RFFA) and glycer-ides (RGLY) are greater than 0%, and the membrane rejection (RGLY) of the glycerides is at least 5% greater than the membrane rejection (RFFA) of the free fatty acids;
   (g) adding a further portion of the process solvent to the organic liquid retained at the first surface of the membrane in step (f).

3. The method of claim 1, wherein the solvent is contacted with the natural oil to reduce the free fatty concentration in the natural oil to less than 50% of the initial concentration.

4. The method of claim 1, wherein the steps of contacting the organic liquid with the selectively permeable membrane under pressure and adding process solvent are repeated until the ratio of free fatty acids to glycerides in the organic liquid retained at the first surface of the membrane is reduced to less than 50% of the initial ratio.

5. The method of claim 1, wherein at least one selectively permeable membrane is used for consecutive membrane filtration stages.

6. The method of claim 1, wherein the glycerides present in the natural oil are retained at the surface of the membrane, and the free fatty acids are not retained at the surface of the membrane.

7. The method of claim 1, wherein the natural oil results from the extraction of a natural feedstock.

8. The method of claim 7, wherein the natural oil derives from material of micro-organism, plant, animal, marine or freshwater origin.

9. The method of claim 8, wherein the natural oil is a fish oil.

10. The method of claim 8, wherein the natural oil is a krill oil.

11. The method of claim 8, wherein the plant derived feedstock include extracts from at least one of palm, soybean, sunflower, olive, peanut, sesame, rice bran, cashew, castor bean, flax, grape, hemp, mustard, poppy, rapeseed, canola, safflower, sesame seed, sunflower, almond, algal, apricot, argan, avocado, hazelnut, neem, peanut, pumpkin, and walnut, or any combination thereof.

12. The method of claim 8, in which the marine feedstock include extracts from at least one of anchovies, Baikal oilfish, bloater, cacha, carp, cod, eel, eulachon, herring, hilsa, jack fish, katla, kipper, mackerel, orange roughy, pangas, pilchards, salmon, sardines, shark, sprats, swordfish, trout, tuna, whale and whitebait.

13. The method of claim 8, in which the freshwater feedstock include extracts from at least one of tilapia, catfish, lake herring, black bass, carp, lake trout and whitefish.

14. The method of claim 1, wherein the glycerides in the natural oil have a molecular weight above 300 Daltons.

15. The method of claim 1, wherein the glycerides in the natural oil have a molecular weight above 400 Daltons.

16. The method of claim 1, wherein the glycerides in the natural oil have a molecular weight above 500 Daltons.

17. The method of claim 1 in which the free fatty acids in the natural oil have a molecular weight less than 400 Daltons.

18. The method of claim 1, wherein the free fatty acids in the natural oil have a molecular weight less than 300 Daltons.

19. The method of claim 1 where less than 30 volumes of solvent is used for solvent extraction of 1 volume of crude natural oil.

20. The method of claim 1, wherein the solvent is chosen from ketones, glycols, esters, ethers, aldehydes, alcohols, and polyols, and mixtures thereof.

21. The method of claim 1, wherein the solvent is chosen from butyl acetate, methyl ether ketone (MEK), acetone, ethanol, methanol, propanol, butanol, butanediol, PEG-400, water, and mixtures thereof.

22. The method of claim 1, wherein the solvent is ethanol.

23. The method of claim 1, wherein the selectively permeable membrane has cylindrical or planar geometry and is configured as spiral wound, plate and frame, shell and tube, or derivative designs thereof.

24. The method of claim 1, where at least one of the membrane separation steps is operated in a dead-end filtration mode.

25. The method of claim 1, wherein at least one of the membrane separation steps is operated in a cross-flow filtration mode.

26. The method of claim 1, wherein the selectively permeable membrane separates glycerides with molecular weights above 300 Daltons from free fatty acids with molecular weights less than 300 Daltons.

27. The method of claim 1, wherein the selectively permeable membrane separates glycerides with molecular weights greater than 400 Daltons from free fatty acids with molecular weights less than 400 Daltons.

28. The method of claim 1, wherein the selectively permeable membrane separates glycerides with molecular weights greater than 500 Daltons from free fatty acids with molecular weights less than 300 Daltons.

29. The method of claim 1, wherein the selectively permeable membrane is formed from a polymeric or ceramic material.

30. The method of claim 1, wherein the selectively permeable membrane is formed from or comprises a material selected from the group consisting of: polymeric material suitable for fabricating microfiltration, ultrafiltration, nanofiltration, or reverse osmosis membranes; polyethylene; polypropylene; polytetrafluoroethylene (PTFE); polyvinylidene difluoride (PVDF); polyethersulfone; polyacrylonitrile; polyamide; polyimides; polyimides crosslinked using mono-, di-, tri- or polyamine species; cellulose acetate; and mixtures thereof.

31. The method of claim 1, wherein the membrane consists essentially of a polyimide polymer based on any of the following:
   (i) a polymer based on 5(6)-amino-1-(4'-aminophenyl)-1,3-trimethylindane and benzophenone tetracarboxylic acid;
   (ii) a polymer with 1 (or 3)-(4-aminophenyl)-2,3-dihydro-1,3,3,(or 1,1,3)-trimethyl-1H-inden-5-amine and 5,5'-carbonylbis-1,3-isobenzofurandione;
   (iii) a copolymer derived from the co-condensation of benzophenone 3,3',4,4'-tetracarboxylic acid dianhydride and a mixture of di(4-aminophenyl) methane and toluene diamine of the corresponding diisocyanates, 4,4'-methylenebis(phenyl isocyanate) and toluene diisocyanate;
   (iv) a copolymer derived from the co-condensation of 1H,3H-Benzo[1,2-c:4,5-c'] difuran-1,3,5,7-tetrone with 5,5'-carbonylbis[1,3-isobenzofurandione], 1,3-diisocyanato-2-methylbenzene and 2,4-diisocyanato-1-methylbenzene.

32. The method of claim 31, wherein the membrane consists of a crosslinked polyimide polymer.

33. The method of claim 32, wherein the membrane consists of a polyimide polymer crosslinked with a mono-, di-, tri- or polyamine species.

34. The method of claim 1, wherein the selectively permeable membrane is formed from or comprises a material selected from a ceramic material suitable for constructing microporous membranes including silicon carbide, silicon oxide, zirconium oxide, titanium oxide, and zeolites.

35. The method of claim 1, wherein the selectively permeable membrane is a composite membrane.

36. The method of claim 1, in which the membrane is non-porous and is formed from or comprises a material selected from modified polysiloxane based elastomers including polydimethylsiloxane (PDMS) based elastomers, ethylene-propylene diene (EPDM) based elastomers, polynorbornene based elastomers, polyoctenamer based elastomers, polypropylene oxide (PPO) based elastomers, polyurethane based elastomers, butadiene and nitrile butadiene rubber based elastomers, natural rubber, butyl rubber based elastomers, polychloroprene (Neoprene) based elastomers, epichlorohydrin elastomers, polyacrylate elastomers, polypropylene glycol (PPG) based elastomers, polyethylene, polypropylene, polytetrafluoroethylene (PTFE), polyvinylidene difluoride (PVDF) based elastomers, polyether-block amides (PEBAX), and mixtures thereof.

37. The method of claim 1, wherein the membrane comprises a reinforcing material selected from an external mesh and support.

38. The method of claim 1, wherein the membrane is a composite membrane comprising a porous support and at least one non-porous layer.

39. The method of claim 38, where the porous support is formed from or comprises a material selected from polymeric material suitable for fabricating microfiltration, ultrafiltration, nanofiltration or reverse osmosis membranes, including polyethylene, polypropylene, polytetrafluoroethylene (PTFE), polyvinylidene difluoride (PVDF), polyethersulfone, polyacrylonitrile, polyamide, polyimides including polyimides crosslinked using mono-, di-, tri- or polyamine species, cellulose acetate, and mixtures thereof.

40. The method of claim 1, wherein the process is performed in a continuous manner.

41. The method of claim 1, wherein the process is performed in a discontinuous manner.

42. The method of claim 1, wherein the membrane is pretreated by soaking in a constituent of the organic liquid phase prior to use in the invention.

43. The method of claim 1, wherein backflushing of the membrane using either solvent or gas is used to improve membrane flux.

44. A natural oil or fatty acid composition, including vegetable oils, fish oils, and long chain omega-3 fatty acid compositions, prepared according to the method of claim 1.

* * * * *